Jan. 6, 1970     F. D. CRAMER     3,488,000
AUTOMATIC WATER SPRINKLING SYSTEM
Filed Nov. 4, 1968
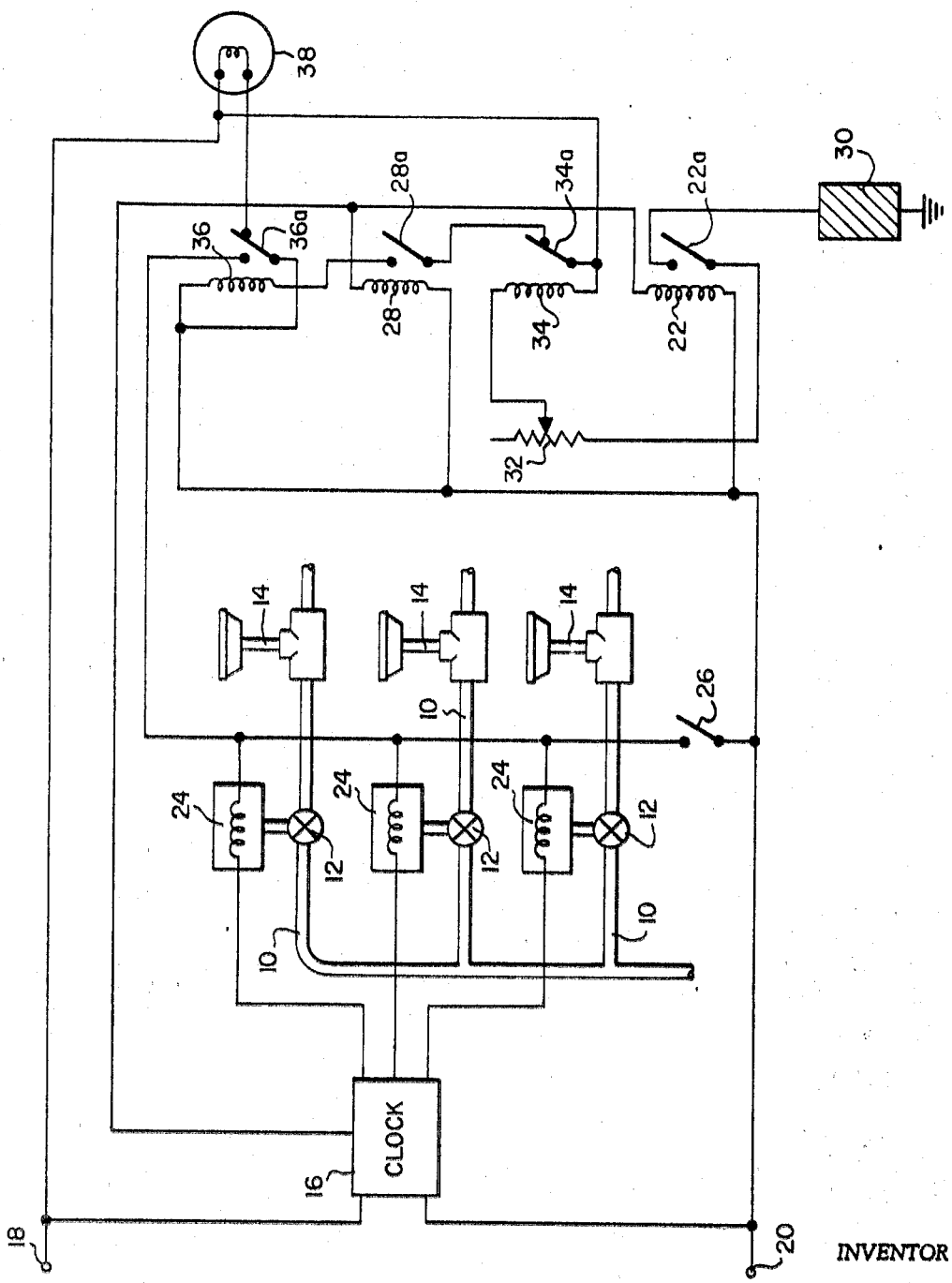
INVENTOR
F. D. CRAMER
BY N.J. Aguilerio
ATTORNEY United States Patent Office 3,488,000
Patented Jan. 6, 1970

3,488,000
AUTOMATIC WATER SPRINKLING SYSTEM
Frank D. Cramer, 4950 NE. 28th Ave.,
Pompano Beach, Fla. 33064
Filed Nov. 4, 1968, Ser. No. 773,259
Int. Cl. A01q 25/00
U.S. Cl. 239—63                                              1 Claim

ABSTRACT OF THE DISCLOSURE

An automatic water sprinkler system including a plurality of solenoid operated sprinkler heads and a control circuit to periodically activate the sprinkler heads when a moisture sensing probe determines the soil needs moisture, the circuit including a delay means to prevent activation of the sprinkler heads when the moisture in the soil is adequate.

BACKGROUND OF THE INVENTION

The present invention relates to sprinkler systems and more particularly to an electrically operated system which automatically controls sprinkling or irrigating of soil in accordance with its moisture content.

To insure grass and plant life of lawns and gardens, proper maintenance and watering is necessary. To eliminate the need for manually watering these areas, a number of automatic watering systems have been developed. One such system, by way of example uses commercially available clock operated switches and magnetic valves for controlling automatic sprinkling systems to water lawn areas at predetermined hours. These clock activated systems are labor saving and eliminate the need for manually watering, however, they tend to be wasteful since water is used on the lawn areas at preset times often when watering is not needed. This may be to the detriment of the growing plants and grass when large amounts of moisture are already in the soil. More sophisticated systems are used in conjunction with humidity, temperature, or soil moisture content measuring instruments, to control the "on" time of the watering systems.

Systems that measure soil moisture content generally use a probe embedded in the ground to determine the electrical resistivity of the soil as a measure of moisture content. Here the soil is used as an electrical conductor between two buried elements of different potential. For example, such systems are shown in the Richards Patent No. 3,039,698 and No. 3,238,392. It is significant to note that systems of this type operate only when the moisture probe indicates the ground needs moisture. Such systems have been found in actual practice to require as much as 50% less watering than with conventional manual or clock operated watering methods.

A shortcoming of many of the moisture content systems utilizing probes in the ground is the decomposition of the probe by electrolysis due to the constant flow of current between the probe and earth.

SUMMARY OF THE INVENTION

The present invention is directed to a water sprinkler system and to a moisture regulated control circuit for use in such a water sprinkling system wherein a series of sprinkler heads are automatically actuated in response to the moisture content of the soil as determined by a moisture sensing probe. The control circuit is activated at selective times only by a switching time clock and thus prevents a deterioration of the moisture sensing probe by electrolysis. The circuit includes a delay means to prevent the actuation of a sprinkler valve operating means when the moisture indicating probe determines the moisture content of the ground is adequate.

Among the objects of the present invention are the provision of an automatic water sprinkling system for irrigation of plants and grass which operates at predetermined hours and in accordance with the moisture content of the soil, the provision of an automatic water sprinkling system wherein circuit means are provided for determining the moisture content of soil and for actuating a series of sprinkler heads when the moisture content of the soil has been determined to be below a selected critical value and the provision of an automatic water sprinkling system including a control circuit having a delay means to prevent the actuation of solenoid operated sprinkler heads when the moisture probe determines the moisture in the soil is adequate.

Other objects and further applicability of the present invention will become more apparent when taken from the detailed description given below in conjunction with the accompanying drawing.

BRIEF DESCRIPTION OF THE DRAWING

The drawing is a diagrammatic view of the automatic water sprinkling system of the present invention including a schematic view of the control circuit and a fragmentary showing of the sprinkler head arrangement.

DESCRIPTION OF THE PREFERRED EMBODIMENT

As illustrated in the drawing, the automatic water sprinkling system of the present invention includes a plurality of sprinkler head lines 10 each of which includes a number of normally closed solenoid operated sprinkler head valves 12 to control the flow of water to a series of sprinkler heads 14. While only three sprinkler head lines and only one sprinkler head valve and sprinkler are shown in the drawing in each water sprinkler line, there will, in normal practice, be a variable number of such lines and sprinkler heads depending upon the size of the area being watered.

The control circuit includes a switching time clock 16 connected across the AC power supply terminals 18 and 20 which has a plurality of contacts which close to complete a circuit at preset time intervals. The present invention operates with a conventional sprinkler time clock such as, by way of example, sprinkler time Model LS 7021 manufactured by International Register Co. Connected between the time clock 16 and the neutral input terminal 20 is a clock relay 22. Also connected to the time clock 16 are a plurality of solenoids 24, one for each solenoid operated valve 12. An emergency switch 26 is connected between the solenoids 24 and the neutral terminal 20. Delay relay 28 also is connected to the 120 volt supply source through time clock 16.

A moisture sensing probe 30, which is normally buried in the ground at a location where the ground moisture is to be monitored, is connected to the positive supply terminal in series with the normally open contact 22a of the clock relay 22, a variable resistor 32 and a moisture control relay 34. A solenoid operating relay 36 is connected across the power supply terminals 18 and 20 in series with normally open contact 28a of the delay relay 28 and normally closed contact 34a of moisture control relay 34. Each of the solenoids 24 are connected to the power supply terminals 18 and 20 through the normally open contact 36a of the solenoid operating relay 36 and the contact switches in the time clock 16. A pilot light 38 is connected to the AC power supply through contact 36a to provide an indication the system is operative during the non-sprinkling hours when the time clock switches are open.

The contacts 26a of moisture control relay 34 are magnetic and provide fast make and break operation to avoid arcing when the ground moisture is not sufficient to pull relay contact 34a beyond the arcing range of the outer contact. Absent this feature, the solenoid operating relay 36 would vibrate and act like a buzzer, sending pulses of 110 volts through the solenoids and the time clock and interfering with television and radio reception in the area.

The operation of the system may be described as follows. Resistor 32 is calibrated and set to a value which will cause sufficient current to flow through the moisture sensing probe 30 when the moisture in the ground is adequate. When the time clock switches are in their normally open position, the relays are deenergized. A circuit is completed from the ground side of the supply source through normally open relay contact 36a and the pilot light 38 to the positive side of the line to indicate the system is in operation. When the time clock switches close at a preset time, a circuit is completed through the clock relay 22 and the delay relay 28. The time clock switches controls one of the solenoids 24 causing it to close opening a valve 12 and its corresponding sprinkler head 14. The clock relay contact 22a closes to connect the moisture control relay 34 and the probe 30 to the AC supply.

If there is sufficient moisture in the ground, the circuit is completed through the probe 30 and the relay moisture control relay 34 operates to open normally closed contact 34a. This prevents actuation of the solenoid operating relay 36 and the system remains deenergized. However, where there is insufficient moisture in the soil, a circuit is not completed through the moisture sensing probe 30 and the relay moisture control relay 34 is not actuated and contact 34a remains closed. After a time delay of a few microseconds, the delay relay 28, which was connected in parallel with the clock relay 22, is energized and its normally open relay contact 28a is closed. This in turn completes a circuit to energize the solenoid operating relay 36. Normally open contact 36a is closed to complete the circuit to a valve solenoid 24 in series with the switch of the time clock 16 which is closed. This in turn opens its corresponding sprinkler valve 12 in the watering system. After a preset time the first time clock is opened to deenergize the first sprinkler head line while a second switch closes. The circuit remains energized and a second sprinkler head line is activated. This step is repeated for as many lines as are used at which time the main clock switch opens and shuts down the system.

It will be appreciated that the above description of the automatic water sprinkling system is illustrative only and numerous modifications and variations may be made in light of the above teachings. For example power relays controlling well pump motors could replace the valve operating solenoids where large areas of coverage are required. It is therefore to be understood that within the scope of the appended claims, the invention may be practiced otherwise than as specifically described herein.

I claim:
1. An automatic moisture actuated sprinkler system comprising:
a water sprinkler line;
a plurality of sprinkler heads connected in said line;
solenoid operated valves connnected to said sprinkler heads to permit flow therethrough when said valves are energized;
a source of electrical power;
first and second relay coils;
presettable clock means connected to said source of power and said first and second relay coils and operable to connect said first and second relay coils to said clock at preselected intervals;
third relay coil and first switch connected in series to said source of supply;
a moisture sensing probe for sensing the moisture in the ground connected in series to said first switch;
second switch means, third switch means and fourth relay coil connected in series across said power supply;
fourth switch means connected to said fourth relay coil and said clock in series with said solenoid operated valve;
said first, second and fourth switches being normally open and said third switch being normally closed;
said first switch being controlled by said first relay to close and connect said probe to said power supply when said first relay is energized by said clock means;
said third switch being controlled by said third relay and being operable to open when said current from said power supply flows through said second relay coil, said first switch and said probe;
said second switch being controlled by said second relay to close after a delay period provided by said second relay;
said delay period being sufficient to allow said first switch to close and said second switch to open if current flows therethrough;
said fourth switch being controlled by said fourth relay to close and connect said power supply to energize said solenoid valves through said presettable clock means when current flows through said first switch.

References Cited
UNITED STATES PATENTS

| | | | |
|---|---|---|---|
| 2,721,101 | 10/1955 | Richard | 239—64 |
| 2,768,028 | 10/1956 | Robinson | 299—27 |
| 2,991,938 | 7/1961 | Norcross | 239—64 |
| 3,024,372 | 3/1962 | Seele | 307—118 |
| 3,039,698 | 6/1962 | Richards | 239—64 |
| 3,238,392 | 3/1966 | Richards | 307—116 |

EVERETT W. KIRBY, Primary Examiner

U.S. Cl. X.R.

239—70, 68; 307—116